United States Patent [19]

Colby et al.

[11] Patent Number: 4,628,171

[45] Date of Patent: Dec. 9, 1986

[54] MECHANICAL FEED EDM MACHINE FOR MAKING THREADED AND NONTHREADED BORES

[75] Inventors: Lloyd E. Colby; John E. Ingalls, both of Whitehall, Mich.

[73] Assignee: Port City Machine & Tool Company, Muskegon Heights, Mich.

[21] Appl. No.: 690,534

[22] Filed: Jan. 11, 1985

[51] Int. Cl.$^4$ .................. B23H 1/00; B23H 7/26; B23G 1/16

[52] U.S. Cl. ................ 219/69 G; 10/129 R; 219/69 R; 219/69 V; 408/131; 408/138

[58] Field of Search ............. 219/69 R, 69 E, 69 G, 219/69 V; 204/129.25, 129.5, 129.7, 224 M; 10/128, 129 R, 129 P, 129 A, 129 M, 136 R, 136 E; 173/163, 165; 408/124, 131, 132, 138, 140, 150, 214

[56] References Cited

U.S. PATENT DOCUMENTS

| | | | |
|---|---|---|---|
| 1,195,145 | 8/1916 | Mattingly | 408/36 |
| 1,245,360 | 11/1917 | Lutz | 408/137 |
| 1,492,167 | 4/1924 | Granger | 219/145.1 |
| 1,754,978 | 4/1930 | Buss | 408/124 |
| 2,059,236 | 11/1936 | Holslag | 219/69 R |
| 2,335,741 | 11/1943 | Contaldi | 10/141 |
| 2,380,387 | 7/1945 | Allen | 408/140 |
| 2,385,665 | 9/1945 | Warwick | 219/69 V |
| 2,404,053 | 7/1946 | Glover | 10/136 |
| 2,417,247 | 3/1947 | Fuller | 408/137 |
| 2,441,319 | 5/1948 | Harding | 219/69 V |
| 2,471,208 | 5/1949 | Gay | 408/137 |
| 2,476,965 | 7/1949 | Emerson | 125/30 |
| 2,501,954 | 3/1950 | McKechnie | 219/69 V |
| 2,526,423 | 10/1950 | Rudorff | 219/69 W |
| 2,650,979 | 9/1953 | Teubner | 219/69 R |
| 2,766,364 | 10/1956 | Higgins | 219/69 V |
| 2,773,968 | 12/1956 | Martellotti | 219/69 R |
| 2,797,299 | 6/1957 | Hill | 219/69 E |
| 2,805,320 | 9/1957 | Palic | 219/108 |

(List continued on next page.)

FOREIGN PATENT DOCUMENTS

| | | |
|---|---|---|
| 624062 | 12/1935 | Fed. Rep. of Germany . |
| 1440632 | 3/1969 | Fed. Rep. of Germany ... 219/69 V |
| 2031796 | 2/1971 | Fed. Rep. of Germany . |
| 2313181 | 12/1973 | Fed. Rep. of Germany ...... 408/137 |
| 1351052 | 3/1963 | France .................. 219/69 G |
| 602471 | 3/1960 | Italy ....................... 219/69 G |
| 184613 | 11/1982 | Japan ...................... 408/124 |
| 257468 | 12/1946 | Switzerland . |
| 357740 | 12/1961 | Switzerland . |
| 10878 | of 1898 | United Kingdom ............ 10/128 |
| 800450 | 8/1958 | United Kingdom . |
| 1440448 | 6/1976 | United Kingdom ............ 219/69 G |
| 2032318 | 5/1980 | United Kingdom ............ 219/69 V |

OTHER PUBLICATIONS

IBM Technical Disclosure Bulletin, vol. 16, No. 10, Mar. 1974, "Ultrasonic Flushing in Electric-Discharge Machining".
A New Dimension in EDM Efficiency-Operational Economy Versatility The Orbiting Head System Inc.
Isocut Electro-Discharge Machining System with Three-Dimensioned Servo-Control, Charmilles Erowa.

Primary Examiner—A. D. Pellinen
Assistant Examiner—Geoffrey S. Evans
Attorney, Agent, or Firm—Price, Heneveld, Huizenga & Cooper

[57] ABSTRACT

An electrical discharge machining device that is used for both rotational EDM, such as tapping, and the like, and for conventional or non-rotational EDM applications. The device includes a base support to which a carriage is slidably mounted, with a motor driven, rotating electrode assembly mounted thereon. A threaded lead screw is removably coupled to the upper end of the rotating electrode assembly and a mating threaded collar is removably mounted on the support so as to receive the lead screw and thereby advance the carriage as the lead screw is rotated. The lead screw and threaded collar are interchangeable with other lead screws and collars having different thread pitches, so as to regulate the advancement of electrodes having different thread pitches. An electrode is mountable both on the rotating electrode assembly and on the carriage itself.

19 Claims, 7 Drawing Figures

U.S. PATENT DOCUMENTS

| | | | |
|---|---|---|---|
| 2,813,280 | 11/1957 | Huffman | 10/136 R |
| 2,813,966 | 11/1957 | Matulaitis | 219/69 G |
| 2,818,490 | 12/1957 | Dixon | 219/69 E |
| 2,841,686 | 7/1958 | Williams | 219/69 R |
| 2,902,584 | 9/1959 | Ullmann | 219/69 E |
| 2,903,556 | 9/1959 | McKechnie | 219/69 V |
| 2,922,021 | 1/1960 | Morris | 219/69 V |
| 2,922,022 | 1/1960 | Mironoff | 219/69 E |
| 3,051,638 | 8/1962 | Clifford et al. | 219/69 E |
| 3,056,734 | 10/1962 | Scott | 204/129.5 |
| 3,072,777 | 1/1963 | McKechnie | 219/69 V |
| 3,180,966 | 4/1965 | Bender | 219/69 V |
| 3,194,938 | 7/1965 | Smith | 219/69 D |
| 3,363,083 | 1/1968 | O'Connor | 219/69 E |
| 3,365,735 | 1/1968 | Brown | 408/137 |
| 3,366,770 | 1/1968 | Blatt | 219/69 G |
| 3,370,147 | 2/1968 | Matulaitis | 219/69 G |
| 3,375,341 | 3/1968 | Richards | 219/69 R |
| 3,427,423 | 2/1969 | O'Connor | 219/69 E |
| 3,430,026 | 2/1969 | O'Connor | 219/69 E |
| 3,433,919 | 3/1969 | Braudeau | 219/69 E |
| 3,435,176 | 3/1969 | Lobur | 219/69 G |
| 3,435,178 | 3/1969 | O'Connor | 219/69 V |
| 3,437,781 | 4/1969 | Webb | 219/69 G |
| 3,439,146 | 4/1969 | Ullmann | 219/69 G |
| 3,444,069 | 5/1969 | Williams | 204/224 |
| 3,456,087 | 7/1969 | Hockenberry | 219/69 P |
| 3,462,576 | 8/1969 | Ellis | 219/69 G |
| 3,474,215 | 10/1969 | Johanson | 219/69 E |
| 3,479,479 | 11/1969 | O'Connor | 219/69 V |
| 3,485,992 | 12/1969 | Sennowitz | 219/69 G |
| 3,506,800 | 4/1970 | O'Connor | 219/69 V |
| 3,510,621 | 5/1970 | Hockenberry | 219/69 G |
| 3,525,843 | 8/1970 | Batterson | 219/69 G |
| 3,531,615 | 9/1970 | Zammit | 219/69 G |
| 3,531,616 | 9/1970 | Sennowitz | 219/69 G |
| 3,548,142 | 12/1970 | Sennowitz | 219/69 C |
| 3,585,339 | 6/1971 | Hockenberry | 219/69 C |
| 3,585,341 | 6/1971 | O'Connor | 219/69 G |
| 3,588,196 | 6/1971 | Bonga | 219/69 G |
| 3,588,431 | 6/1971 | Pekelharing | 219/69 C |
| 3,594,537 | 7/1971 | Morgenegg | 219/69 E |
| 3,604,884 | 9/1971 | Olsson | 219/69 G |
| 3,610,767 | 10/1971 | Nutt | 408/138 |
| 3,611,463 | 10/1971 | Schirtzinger et al. | 10/129 R |
| 3,614,370 | 10/1971 | Italo | 219/69 E |
| 3,622,734 | 11/1971 | Mainwaring | 219/69 E |
| 3,637,481 | 1/1972 | Williams | 204/224 |
| 3,654,420 | 4/1972 | Saito | 219/69 G |
| 3,657,507 | 4/1972 | McNeece | 219/69 G |
| 3,684,682 | 8/1972 | Kazushige Koike | 204/224 |
| 3,688,074 | 8/1972 | Stirner | 219/69 G |
| 3,696,014 | 10/1972 | Goodard | 204/143 M |
| 3,711,105 | 1/1973 | Johanson | 219/69 E |
| 3,724,084 | 4/1973 | McNeece | 33/185 R |
| 3,725,631 | 4/1973 | Angelucci | 219/69 G |
| 3,758,739 | 9/1973 | De Jongh et al. | 219/69 G |
| 3,764,771 | 10/1973 | Roy | 219/69 V |
| 3,767,317 | 10/1973 | Ortlieb | 408/183 |
| 3,775,580 | 11/1973 | Scherbaum | 219/69 E |
| 3,786,223 | 1/1974 | O'Connor | 219/69 V |
| 3,788,760 | 1/1974 | Daniels | 408/137 |
| 3,801,487 | 4/1974 | Pahl | 204/224 M |
| 3,809,852 | 5/1974 | Weber | 219/69 V |
| 3,833,785 | 9/1974 | Roach | 219/69 G |
| 3,843,864 | 10/1974 | Wohlabaugh | 219/69 G |
| 3,855,442 | 12/1974 | Check | 219/69 E |
| 3,878,351 | 4/1975 | Rocklin | 219/69 G |
| 3,919,516 | 11/1975 | Ullmann | 219/69 G |
| 3,969,601 | 7/1976 | Rocklin | 219/69 G |
| 3,987,269 | 10/1976 | Inoue | 219/69 M |
| 4,001,538 | 1/1977 | Michalski | 219/69 M |
| 4,013,862 | 3/1977 | O'Connor | 219/69 E |
| 4,039,779 | 8/1977 | Rupert | 219/69 G |
| 4,043,700 | 8/1977 | Singer | 408/131 |
| 4,289,947 | 9/1981 | Inoue | 219/69 M |
| 4,310,742 | 1/1982 | Pfau | 219/69 G |
| 4,319,115 | 3/1982 | Bonga | 219/69 R |
| 4,324,969 | 4/1982 | Inoue | 219/69 C |
| 4,337,385 | 6/1982 | Maropis | 219/69 V |
| 4,363,950 | 12/1982 | Mateja | 219/69 R |
| 4,387,284 | 6/1983 | Nicholas et al. | 219/69 R |
| 4,423,302 | 12/1983 | Shimizu | 219/69 G |
| 4,425,492 | 1/1984 | Wyss | 219/69 M |
| 4,430,180 | 2/1984 | Shimizu | 204/129.55 |
| 4,439,659 | 3/1984 | Shimizu | 219/69 V |
| 4,459,190 | 7/1984 | Inoue | 204/129.35 |
| 4,463,240 | 7/1984 | Drushel | 219/69 G |
| 4,549,061 | 10/1985 | Nicholas et al. | 219/69 E |

MECHANICAL FEED EDM MACHINE FOR MAKING THREADED AND NONTHREADED BORES

BACKGROUND OF THE INVENTION

The present invention relates to electrical discharge machining (EDM) devices, and more particularly to heads and advancement mechanisms for EDM devices.

Electrical discharge machining is conventionally used to machine very hard, electrically conductive workpieces, and the like, that are difficult or impossible to machine by conventional methods. In normal applications of EDM, the workpiece is immersed in a bath of dielectric fluid, and a power supply is applied across the cutting tool and the workpiece. When the cutting electrode is brought sufficiently proximite to the workpiece, the dielectric fluid breaks down, and an electric discharge or spark is generated across the space or gap between the electrode and the workpiece. With the electrical discharge, a minute amount of material is removed from the workpiece.

It will be appreciated that in EDM processes, the spacing between the two electrodes, or the "spark gap", is critical. If the spark gap becomes too small, or actual physical contact is made, a short circuit occurs between the cutting electrode and the workpiece. Such a short circuit results in either the fusing of the cutting electrode to the workpiece, or a melting or embrittling of the effected area of the workpiece. A fused electrode is very difficult and time consuming to remove, and if sufficient damage occurs, the workpiece must be scrapped.

The problem of maintaining a proper spark gap is further complicated when an EDM device is used to tap holes in or through a workpiece. In such tapping operations the cutting electrode must be rotated as it is advanced into the workpiece. Heretofore, due to the difficulty of maintaining the proper spark gap, thread tapping EDM devices were often forced to rely upon hand advancement of the cutting tool, in order to properly control the machining process. However, an operator is not always capable of reacting quickly enough when the spark gap becomes too small in order to reverse the advancement of the cutting electrode. Further, hand advanced machines are relatively slow, and difficult to accurately control. Such hand advanced machines require an operator's constant attendance, which greatly increases the labor costs of machining the workpiece.

Some EDM devices have utilized automatic advancement of the thread tapping electrode. However, the advance mechanism for the electrode is relatively complex, and cannot be readily converted to cut different thread styles and sizes. The set-up time for such prior machines is therefore substantial. Further, multiple EDM devices are required in order to produce a full range of machining operations. Thread tapping EDM devices, that are designed for rotational advancement of the electrode, are not capable of being used for conventional EDM applications, in which the cutting electrode does not rotate. Similarly, devices designed for conventional EDM applications cannot be used for thread tapping.

SUMMARY OF THE INVENTION

The present invention solves the problems noted above by the provision of an EDM device that performs both rotational machining and conventional, non-rotational machining. The EDM device includes a moving carriage on which an electrode rotating assembly is mounted. The device regulates the advancement of the entire carriage relative to the device's support, so that an EDM electrode may be advanced either by the rotating assembly for thread tapping applications, or by the carriage itself for conventional, non-rotational EDM machining applications.

Additionally, the EDM device permits rapid and easy set up for a wide variety of different machining operations. The device includes a threaded guide rod or lead screw that is removably and interchangeably coupled to the motor-driven, rotating drive shaft for the cutting electrode. A mating threaded sleeve is removably and interchangeably mounted on the device support, so that as the drive shaft rotates the mating guide rod and sleeve automatically advance the drive shaft. The guide rod and sleeve have a thread pitch that corresponds to the thread pitch of the cutting electrode, so that when the tapping electrode is changed, the threaded rod and sleeve are simply interchanged with a guide rod and sleeve having a corresponding thread pitch.

These and other objects, features, and results of the invention will be apparent to one skilled in the art from the written specification, claims, and drawings herewith.

DETAILED DESCRIPTION OF THE PREFERRED EMBODIMENT

Figure 1:
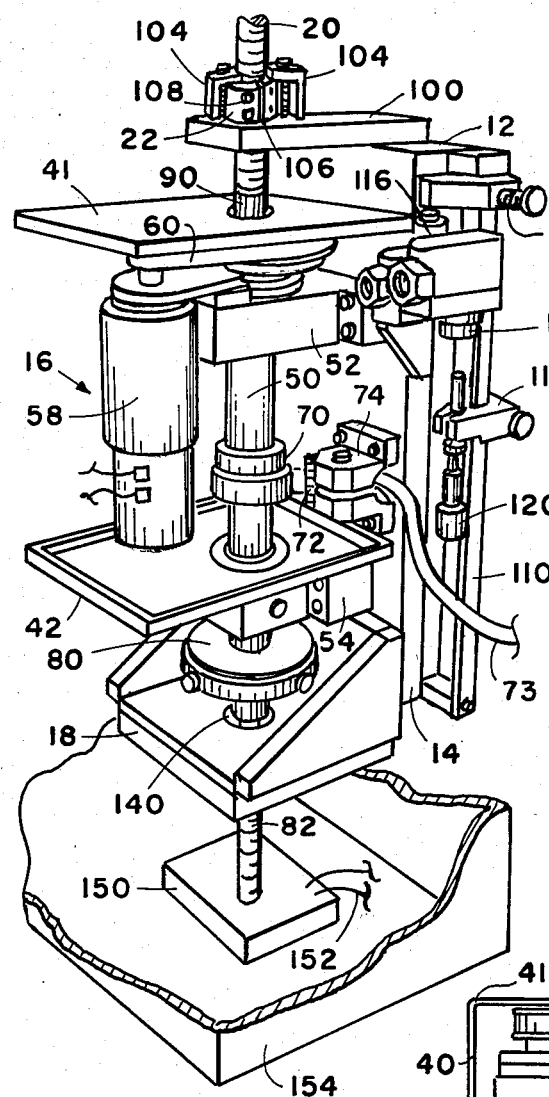
FIG. 1 is a fragmentary, perspective view of an EDM device embodying the present invention, shown in the fully raised condition.

In the preferred embodiment, as shown in FIGS. 1–4, an EDM device is referenced generally by the numeral 10. EDM device 10 includes a normally stationary support 12 on which is mounted a slidable carriage 14. A rotating electrode drive assembly 16 is mounted on carriage 14 and translates therewith. Carried on the lower end of carriage 14 is an electrode mounting platen 18 (FIGS. 1-3) that is used in non-rotational or conventional EDM applications. At the top of drive assembly 16 is coupled a threaded guide rod or lead screw 20, which is matingly received in a threaded guide collar 22 mounted on support 12. Both guide rod 20 and guide collar 22 have a thread pitch that matches the pitch of the thread to be machined in the workpiece. As drive assembly 16 rotates, lead screw 20 and guide collar 22 cooperate to advance carriage 14, and thus simultaneously advance drive assembly 16. Lead screw 20 and guide collar 22 are removably, interchangeably coupled to EDM device 10, so as to be readily accessible for interchanging with other lead screws and collars that correspond to various other thread pitches.

Figure 2:
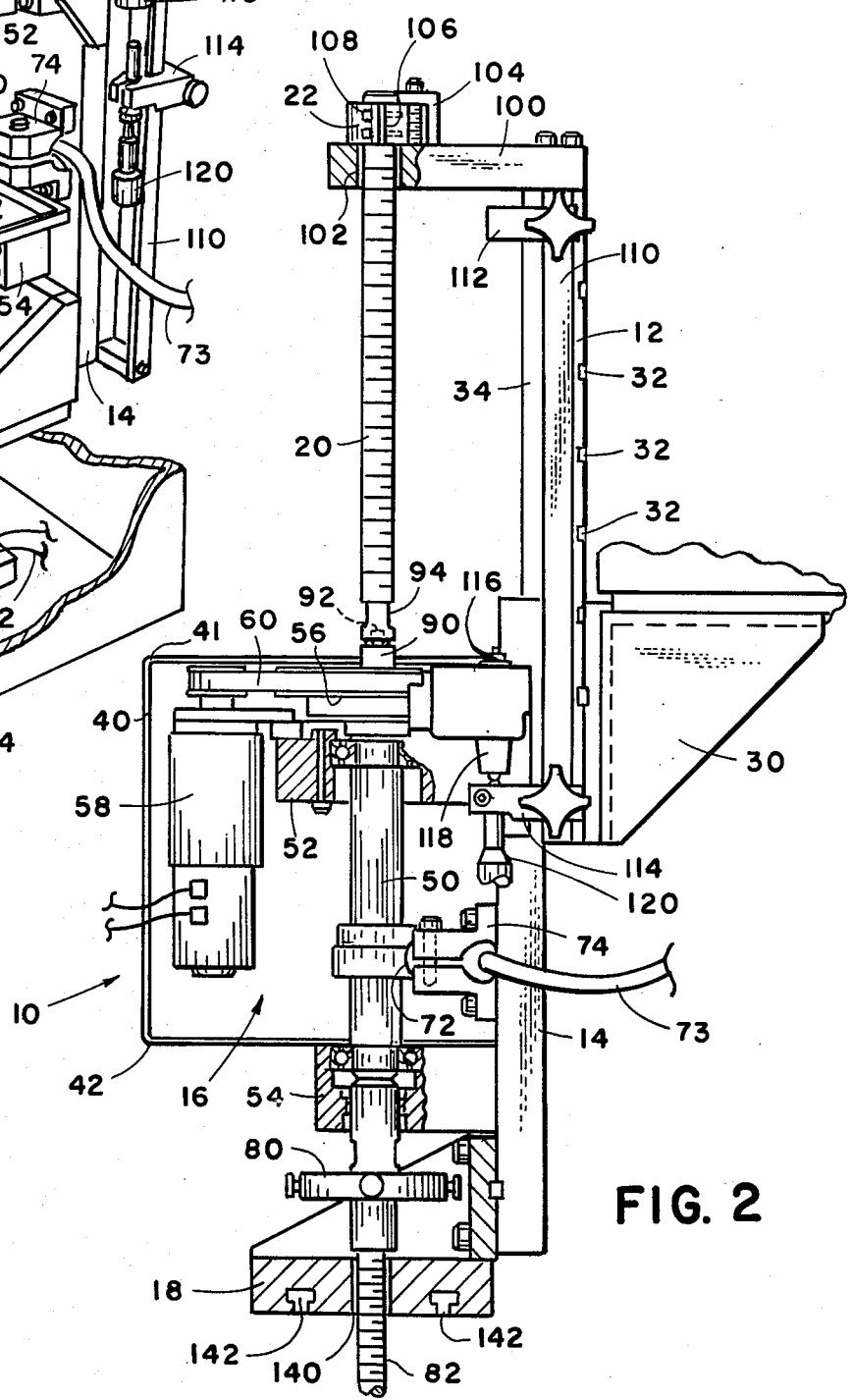
FIG. 2 is a fragmentary, side elevational, sectional view of the device of FIG. 1, shown in a fully lowered condition.

More specifically, as shown in FIG. 2, support 12 is a flat, generally vertical base plate that is mounted upon a suitable normally stationary stand 30. As shown in FIG. 2, stationary stand 30 is the support stand for a conventional, non-rotating EDM device. On the rear surface of support plate 12 are a number of mounting channels 32 in which a mounting key or the like may be inserted for mounting on stationary stand 30. Alternatively, support plate 12 may be secured to stand 30 by bolts or other conventional fasteners. Extending along the forward face of support plate 12 is a pair of vertical ways 34 (FIG. 3) on which carriage 14 is slidably mounted.

Carriage 14 is a rectangular, generally flat plate having a pair of vertical ways 36 extending along the rearward surface, and rearwardly extending side edges that accommodate the sliding engagement of ways 36 with ways 34. As shown in FIG. 2, on the forward face of carriage 14 is secured a drive assembly housing 40. As shown in FIG. 1, housing 40 includes a rectangular top wall 41 and a rectangular bottom wall 42, to which removable sidewalls are secured in order to permit access to drive assembly 16.

Figure 3:
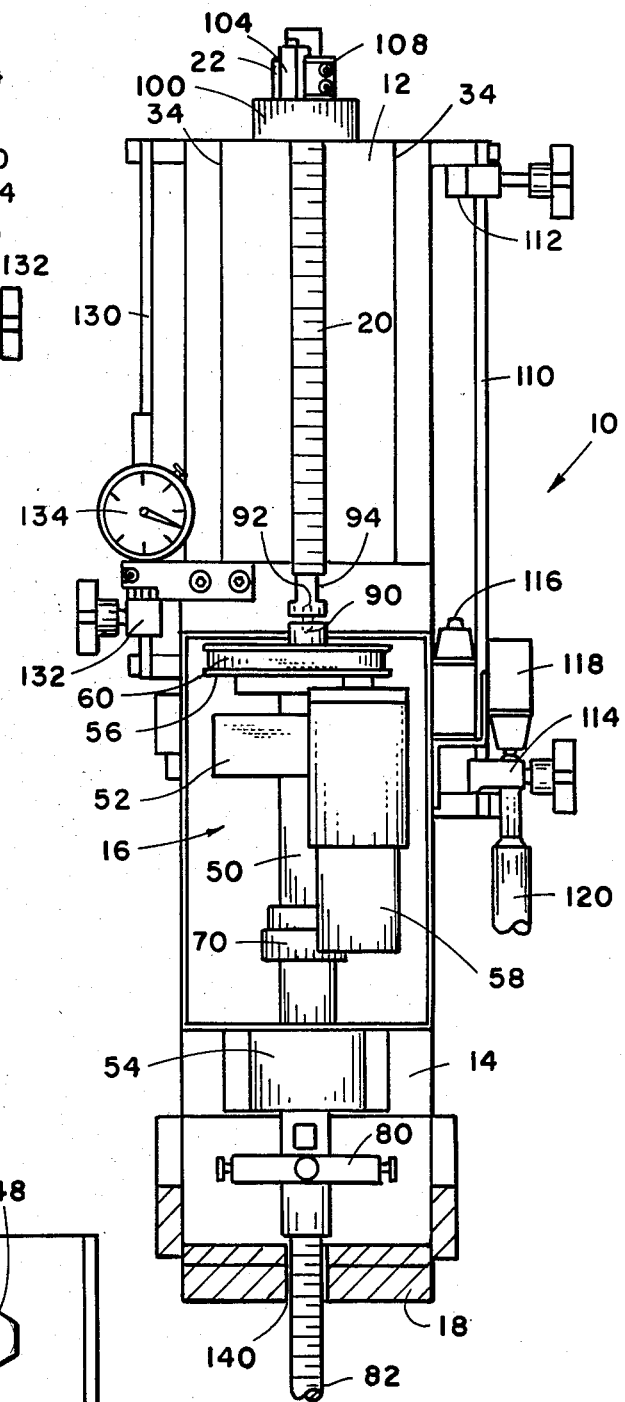
FIG. 3 is a fragmentary, front elevational, sectional view of the device of FIG. 1, shown in a fully lowered condition.

Drive assembly 16 is mounted on the forward face of carriage plate 14 (FIGS. 1–3). Drive assembly 16 includes an axially vertically oriented drive shaft 50 that is rotationally mounted in an upper bearing 52 and a lower bearing 54. Bearings 52 and 54 are preferably conventional ball bearings. Shaft 50 is rotated by means of a driven pulley 56 keyed to the upper end of drive shaft 50. A direct current, servomotor 58 is mounted on carriage 14, and translates with it. Motor 58 is reversible, and is capable of rotating in very small increments or arcs in response to an electrical controller (not shown). In this example, motor 58 is mounted on the outer face of upper bearing 52. Motor 58 is operably connected to drive shaft pulley 56 by an endless drive belt 60. Drive belt 60 is a syncronous belt, with cogs along the inner surface to positively engage belt 60 with pulley 56 and prevent any slippage of belt 60 as motor 58 reverses direction. Motor 58 is used to rotate shaft 50 for both the rotation of the cutting electrode, and the advancement of carriage 14, as described below. Preferably, motor 58 is electrically insulated from the EDM device to prevent damage thereto by the direct current cutting current.

Mounted on shaft intermediate bearings 52 and 54 is a rotating couple or commutator ring 70. Commutator 70 is secured to shaft 50 by set screws or other conventional fasteners and is electrically conductive with shaft 50. An electrically conductive brushing 72 (FIGS. 1 and 2) contacts commutator 70 and is mounted on carriage plate 14 by a mounting bracket 74. Current is applied to brushing 72 through cable 73 from a power source (not shown) of conventional design, in order to apply operational power to the cutting electrode as discussed below. Brushing 72 is removably mounted in bracket 74 so that brushing 72 may be replaced as excessive wear occurs, in order to maintain proper registry with commutator 70. Commutator 70 insures that the electrical power flows directly through drive shaft 50 to the electrode to prevent damage to bearings 52 and 54.

Secured to the lower end of shaft 50 is an alignment head 80 of the type used in the mounting of cutting bits on conventional machining tools. Alignment head 80 includes a lower mounting aperture in which a cutting electrode 82 is removably secured. Alignment head 80 is adjustable in order to maintain electrode 82 in substantial vertical alignment as electrode 82 is rotated.

Cutting electrode 82, as shown in FIGS. 1–3, is a threaded, tapping EDM electrode. Electrode 82 has an elongated shaft of sufficient length to pass through the particular workpiece being machined. Tapping electrodes 82 have a variety of thread patterns that vary in pitch, depth, direction of threading and the like, as determined by the particular threaded aperture intended to be produced. Alternatively, other types of cutting electrodes 82, such as cylindrically shaped electrodes or single point electrodes, may be used to machine non-threaded circular bores through the workpiece. Such electrodes 82 will produce a smooth bored aperture, and the rotation of electrode 82 insures that the aperture produced will be correctly aligned through the workpiece.

Protruding above pulley 56 is an upper coupling end 90 of drive shaft 50. As shown in FIGS. 2 and 3, upper coupling end 90 includes a threaded, upstanding projection 92 onto which lead screw 20 is secured. Lead screw 20 is therefore axially aligned with drive shaft 50, and thereby is axially aligned and commonly rotating with electrode 82. Located at the lower end of guide rod 20 is a pair of opposed flats 94 that provide a seat for a conventional wrench. Flats 94 provide a means for holding onto lead screw 20 as lead screw 20 and shaft 50 are screwed together. Lead screw 20 may therefore be quickly removed from shaft 50, since coupling end 90 and flats 94 are readily accessible to the operator from outside of housing 40.

Lead screw 20 is threaded with a pitch that is substantially identical to the thread pitch of electrode 82. Various alternative lead screws 20 are therefore interchangeable with lead screw 20 on device 10, with each particular lead screw complementing a particular electrode 82.

Fixed to the upper surface of support plate 12 is collar mounting bar 100. Mounting bar 100 is a rectangular metal block that is bolted to support plate 12 and which extends out over shaft 50. As best shown in FIG. 2, located through the forward end of mounting bar 100 is an aperture 102 through which lead screw 20 is slidably received. The diameter of aperture 102 is slightly greater than the outer diameter of threaded lead screw 20 so that lead screw 20 does not engage mounting bar 100. Guide collar 22 is clamped to the upper surface of mounting bar 100 by a pair of L-shaped clamps 104. Guide collar 22 is located to be communicative with aperture 102 and matingly receive lead screw 20. Clamps 104 are bolted into mounting bar 100 so that guide collar 22 may be quickly and easily removed with the use of a wrench. However, clamps 104 tightly secure collar 22 to mounting bar 100 so that collar 22 remains fixed in position during operation of device 10.

Figure 4:
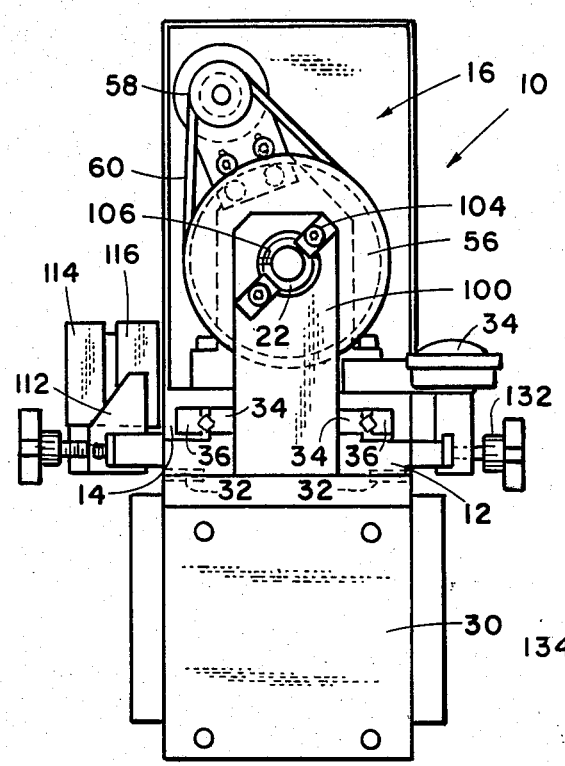
FIG. 4 is a top plan view of the device of FIG. 1.

Collar 22 is threaded in order to mate with the thread of lead screw 20, thereby acting as a lead screw guide. A variety of collars 22 are therefore interchangeable with guide collar 22 on device 10 in order to accommodate a variety of electrodes 82. As shown in FIGS. 1, 2 and 4, collar 22 is a split 106 ring that is closed by a pair of tightening bolts 108. The diameter of guide collar 22 may therefore be reduced by tightening bolts 108. Collar 22 is tightened in order to maintain intimate contact between the threads of collar 22 and lead screw 20 and therefore collar 22 insures the accuracy of the threads cut by electrode 82.

On one side of support plate 12 is secured a vertical stop-mounting bar 110. Stop-mounting bar 110 is a relatively thin metal bar on which an upper stop 112 and a lower stop 114 are adjustably mounted. Upper and lower stops 112 and 114 are adjustably affixed to bar 110 by hand-turned clamp bolts so as to be selectively positionable along the length of bar 110. Stops 112 and 114 form adjustable contact surfaces for an upper limit switch 116 and a lower limit switch 118, respectively, that are fixedly mounted on sliding carriage 14. Limit switches 116 and 118 are of a conventional type and are used to signal the EDM device control (not shown) when carriage 14 has reached the preselected maximum upper and lower travel positions. The travel or stroke of electrode 82 may therefore be selected by adjusting the position of upper and lower stops 112 and 114. Also mounted on lower stop 114 is a switch 120. Switch 120 is positioned on lower stop 114 so as to be contacted by limit switch 118 when carriage 14 reaches the lower limit of its travel. Switch 120 signals the device control (not shown) in order to shut off power to brushing 72, reverse the direction of rotation of motor 58 and to increase the speed at which motor 58 rotates shaft 50. By means of switch 120, when machining of the workpiece has been completed, device 10 retracts electrode 82 at an increased speed, and thereby reduces the down time of EDM device 10.

Secured to the side of support plate 12 opposite stop mounting bar 110 is another stop mounting bar 130. Mounting bar 130 extends along support plate 12 and includes a stop 132 that is adjustably mounted thereon so as to be slidable along the length of bar 130. Stop 132 is fixed in position on mounting bar 130 by a hand turned clamp bolt so as to be selectively positioned anywhere along the length of mounting bar 130. Secured to the upper edge of carriage 14 is a displacement gauge 134. Displacement gauge 134 is a conventional dial-type displacement gauge that engages mounting bar 130 and measures the relative displacement of gauge 134 along the length of bar 130. Stop 132 is used as a zero-point positioned at the maximum lower limit of travel of electrode 82. After gauge 134 has been zeroed at stop 132, during operation of device 10 gauge 134 provides the operator with information on the amount of machining that remains.

Platen 18 (FIGS. 1–3) is secured to the lower end of carriage 14 so as to extend at right angles from the forward face of carriage 14. Platen 18 extends underneath shaft 50 and alignment head 80 and a vertically oriented aperture 140 extends through platen 18 in alignment with shaft 50. Electrode 82 passes through aperture 50 and protrudes beneath platen 18 in order to access the workpiece beneath platen 18. Aperture 140 has a diameter greater than the greatest diameter of electrode accommodated by alignment head 80. Electrode 82 therefore does not engage platen 18 during operation of EDM device 10.

Figure 6:
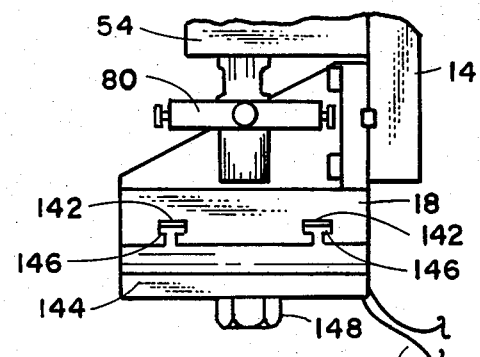
FIG. 6 is a fragmentary, side elevational view of the electrode mounting region of the device of FIG. 1, shown in a configuration for non-rotational, conventional EDM machining.
Figures 5, 7:
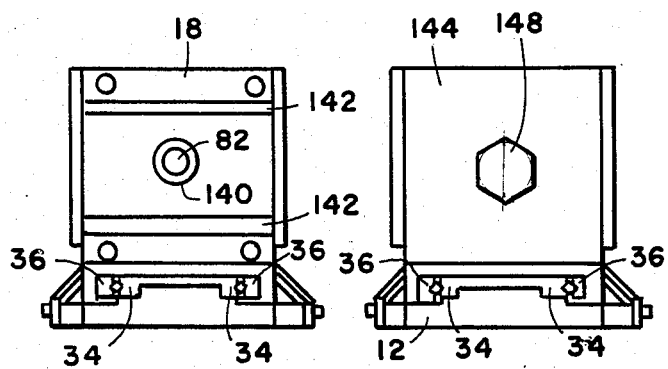
FIG. 5 is a bottom plan view of the device of FIG. 1, shown in a configuration for tapping.
FIG. 7 is a bottom plan view of the device as shown in FIG. 6, shown in a configuration for non-rotational, conventional EDM machining.

On the lower surface of platen 18 are two T-shaped channels 142 (FIGS. 2, 6), which are used to mount an electrode plate 144 (FIG. 6) for non-rotational, or conventional machining. Electrode plate 144 includes two mating T-shaped projections 146 which are received and secured in channels 142 in a suitable manner. On the lower surface of electrode plate 144 is a depending electrode 148, FIGS. 6 and 7. Electrode 148 has a configuration other than a regular cylinder, thus requiring that electrode 148 be advanced non-rotationally in order to produce a properly configured cavity. Electrode 148 includes a pair of conventional electrical leads 149 that are connected to a conventional EDM power supply. As motor 58 rotates, shaft 50 causing thread lead screw 20 to advance carriage 14, and electrode 148 is advanced non-rotationally toward the workpiece.

In operation, to tap an aperture through a workpiece 150, workpiece 150 is connected to the EDM control by leads 152 in a conventional manner and workpiece 150 is immersed in a bath 154 of dielectric fluid. An appropriate threaded electrode 82 is selected and coupled in alignment head 80. A corresponding threaded lead screw 20 and mating guide collar 22 are selected, with lead screw 20 telescopingly slid through aperture 102 and screwed onto shaft projection 92. A wrench is fitted onto flats 94 in order to fully tighten lead screw 20 onto drive shaft 50. Collar 22 is threaded over the upper end of lead screw 20 and is fixedly clamped onto mounting bar 100 by collar clamps 104. Bolts 108 are tightened until the threads of collar 22 intimately contact the threads of lead screw 20. Displacement gauge stop 132, and limit switch stops 112 and 114 are set at the required level with electrode 82 positioned adjacent the workpiece.

The electrical control unit (not shown) for EDM device 10 applies current to brushing 72 in a conventional fashion to provide current to electrode 82. Motor 58 rotates drive shaft 50 in a direction of advancement along with lead screw 20. The rotation of lead screw 20 in guide collar 22 causes carriage 14 to lower, and therefore downwardly advances electrode 82 toward workpiece 150. Included in the control unit is a mechanism for determining the spark gap between electrode 82 and the workpiece. When the spark gap has become too small, the control unit automatically reverses motor 58. The reversal of motor 58 causes electrode 82 to be raised, or backed off of the workpiece 150, until the current drain falls within predetermined acceptable limits. The operational direction of motor 58 is then again reversed in order to recommence advancement and machining of electrode 82 through the workpiece 150. When lower limit switch 118 reaches lower stop 114 at its maximum downward travel, motor 58 is reversed to withdraw electrode 82. Switch 120 simultaneously increases the speed of motor 58, so that down time for device 10 during the raising of carriage 14 is reduced. When upper limit switch 118 contacts upper stop 112, electric motor 58 is shut off.

In applications where EDM device 10 is used for conventional or non-rotational machining, the process followed is similar to that set forth above with the exception that electrode plate 144 with non-rotating electrode 148 is mounted onto platen 18. Motor 58 still provides the advancement function for carriage 14 and thus for electrode 148, but alignment head 80 rotates above platen 18. As described above, the control unit senses the current applied to electrode 148, so that motor 58 is reversed in the event that the spark gap between electrode 148 and the workpiece 150 becomes too small.

Alternatively, lead screw 20 and threaded electrode 82 may be coupled to the same end of shaft 50 (not shown). In such an alternative embodiment, lead screw 20 is connected to the lower end of shaft 58 by a coupling similar to coupling end 90 described above. Guide collar 22 is mounted on a lower depending end of support plate 12. Electrode 82 is then coupled by a similar alignment head 80 directly to the lower end of lead screw 20, so that electrode 82 is coupled to shaft 50 by means of lead screw 20. Essentially, EDM device 10 is inverted, and electrode 82 is then coupled to the lower end of lead screw 20.

Further, non-rotating, or conventional electrodes 148 may also be mounted on the same side of carriage 14 as lead screw 20. EDM device 10 is inverted, and a portion of the resulting lower end of support plate 12 is extended to depend beneath the lower end of lead screw 20. Electrode 148 is then mounted on the depending portion of support plate 12 for non-rotational machining as described above.

It will be understood by one skilled in the art from the above description that various modifications and improvements may be made without departing from the spirit of the invention disclosed herein. The scope of the protection afforded is to be determined by the claims which follow and the breadth of interpretation that the law allows.

The embodiments of the invention in which an exclusive property or privilege is claimed are defined as follows:

1. An electrical discharge machining device for producing variously sized, threaded apertures with corresponding, threaded cutting electrodes, comprising:
    a normally stationary support member;
    a carriage mounted on said support member for generally longitudinal translation therealong;
    a drive shaft, having first and second ends, and being mounted on said carriage for generally axial rotation thereon;
    a motor mounted on said carriage, and operably coupled to said drive shaft for axially rotating said drive shaft;
    a threaded lead screw for translating said carriage with respect to said stationary support member; said lead screw having first and second ends, with the first end of said lead screw removably and interchangeably coupled to the first end of said drive shaft; said lead screw having a predetermined thread pitch corresponding to the pitch of the threaded aperture to be formed;
    a lead screw guide removably and interchangeably mounted on said stationary support member, and having a threaded aperture therethrough in which said threaded lead screw is matingly received; said lead screw guide having a predetermined thread pitch corresponding to the pitch of the threaded aperture to be formed;
    means for removably and interchangeably coupling a selected, corresponding one of a plurality of electrodes with one of said drive shaft second end, and said lead screw second end for rotation therewith, whereby rotation of said motor both rotates the selected electrode and simultaneously translates the selected electrode longitudinally with respect to a corresponding electrically conductive workpiece for automatically regulating the rate of longitudinal movement of the selected electrode to insure accurately formed threads; and
    means for applying electrical energy to the selected electrode, and being removably connected therewith, so that multiple pairs of lead screws and lead screw guides, having different thread pitches, can be easily removed and interchanged with said machining device to produce variously sized threaded apertures.

2. The device of claim 1, wherein:
    said electrode coupling means couples the selected electrode with the second end of said drive shaft.

3. The device of claim 2, further comprising:
    means for removably mounting a conventional, non-rotating EDM electrode to said carriage in a stationary relationship therewith; and
    means for applying electrical energy to said conventional, non-rotating EDM electrode, whereby rotation of said motor longitudinally translates said conventional, non-rotating EDM electrode with respect to the corresponding workpiece for conventional EDM machining.

4. The device of claim 2, wherein:
    said lead screw guide includes contractable sides disposed about said threaded aperture, and means for tightening said lead screw guide about said lead screw, whereby accurate registry is maintained between said lead screw and said mating lead screw guide by tightening said tightening means.

5. The device of claim 4, wherein:
    said lead screw guide is a split collar having tightening bolts thereon.

6. The device of claim 5, wherein:
    said drive shaft is rotatably mounted in bearings with said first end protruding above said bearings and a motor coupling for said motor; and
    said threaded lead screw is threadedly coupled with said shaft first end.

7. The device of claim 6, wherein:
    said motor comprises an electric, direct current servomotor.

8. The device of claim 7, wherein
    said electrode energy applying means comprises a rotating couple mounted on said drive shaft.

9. The device of claim 1, wherein:
    said drive shaft and said lead screw are axially aligned for quick replacement and accurate drive.

10. The device of claim 1, further comprising:
    means for removably mounting a conventional, non-rotating EDM electrode to said carriage in a stationary relationship therewith; and
    means for applying electrical energy to said conventional, non-rotating EDM electrode, whereby rotation of said motor longitudinally translates said conventional, non-rotating EDM electrode with respect to the corresponding workpiece for conventional EDM machining.

11. The device of claim 1, wherein:
    said lead screw guide includes contractible sides disposed about said threaded aperture, and tightening means for tightening said lead screw guide about said lead screw, whereby accurate registry is maintained between said lead screw and said mating lead screw guide by tightening said tightening means.

12. The device of claim 1, wherein:
    said lead screw guide is a split collar having tightening bolts thereon.

13. The device of claim 1, wherein:
    said drive shaft is rotatably mounted in bearings with said first end protruding above said bearings and a motor coupling for said motor; and
    said threaded lead screw is threadedly coupled with said shaft first end.

14. The device of claim 1, wherein:
    said motor comprises an electric, direct current servomotor.

15. The device of claim 1, wherein:
said electrode energy applying means comprises a rotating couple mounted on said drive shaft.

16. The device of claim 1, wherein:
said drive shaft and said lead screw are axially aligned for quick replacement and accurate drive.

17. An electrical discharge machining device comprising:
a generally vertically oriented base plate;
a carriage plate vertically slidably mounted on said base plate;
a drive shaft rotatably mounted on said carriage plate;
an electric motor drive coupled to said drive shaft and mounted on said carriage plate for movement therewith;
a first electrode coupling on a lower end of said drive shaft;
means for supplying electrical power to an electrode coupled to said first electrode coupling;
a plurality of sets of threaded lead screws, threaded guide sleeves and threaded electrodes, each said set including a threaded electrical discharge machining electrode and a threaded lead screw having matching thread pitches, and each said set including a threaded guide sleeve having a thread pitch mating with said thread pitch of said threaded lead screw, said thread pitches of each of said sets being different from thread pitches of other ones of said sets; and
each said threaded lead screw being removably couplable to an upper end of said drive shaft and each said threaded guide sleeve being removably mountable on said base plate to matingly receive one of said threaded lead screws coupled to said drive shaft, whereby said sets of threaded lead screws, threaded guide sleeves and threaded electrodes are interchangeable with other ones of said sets having different thread pitches.

18. The device of claim 17, further comprising:
a second electrode coupling on said carriage plate, said second electrode coupling mounted for non-rotational movement with said carriage plate; and
means for supplying electrical power to an electrode coupled to said second electrode coupling, whereby said electrical discharge machining device provides both rotational electrical discharge machining and non-rotational electrical discharge machining.

19. An electrical discharge machining device comprising:
a normally stationary support member;
a carriage mounted on said support member for generally longitudinal translation therealong;
a drive shaft, having first and second ends, and being mounted on said carriage for generally axial rotation thereon;
a motor mounted on said carriage, and operably coupled to said drive shaft for axially rotating the same;
a threaded lead screw for translating said carriage with respect to said stationary support member; said lead screw having first and second ends, with the first end of said lead screw removably and interchangeably coupled to the first end of said drive shaft; said lead screw having a predetermined thread pitch;
a lead screw guide removably and interchangeably mounted on said stationary support member, and having a threaded aperture therethrough in which said threaded lead screw is matingly received; said lead screw guide having a predetermined thread pitch corresponding to the thread pitch of said lead screw;
means for removably coupling an electrode with one of said drive shaft second end and said lead screw second end for rotation therewith, whereby rotation of said motor both rotates the selected electrode and simultaneously translates the selected electrode longitudinally with respect to a corresponding workpiece for automatically regulating the rate of longitudinal movement of the selected electrode; and
means for applying electrical energy to the electrode.

* * * * *